United States Patent
Bahrami et al.

(10) Patent No.: US 11,589,362 B2
(45) Date of Patent: Feb. 21, 2023

(54) RADIO FREQUENCY SPECTRUM MANAGEMENT SYSTEMS AND METHODS IN A MANUFACTURING ENVIRONMENT

(71) Applicant: Ford Global Technologies, LLC, Dearborn, MI (US)

(72) Inventors: Mohsen Bahrami, Birmingham, MI (US); Hamed Asadi, Troy, MI (US); Mohammad Nekoui, Novi, MI (US); Michael Miotto, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 17/122,413

(22) Filed: Dec. 15, 2020

(65) Prior Publication Data
US 2022/0191874 A1 Jun. 16, 2022

(51) Int. Cl.
*H04W 72/04* (2009.01)
*H04W 72/08* (2009.01)
*H04W 84/12* (2009.01)
*H04W 4/80* (2018.01)

(52) U.S. Cl.
CPC ............ *H04W 72/082* (2013.01); *H04W 4/80* (2018.02); *H04W 84/12* (2013.01)

(58) Field of Classification Search
CPC ........ H04L 1/0026; H04W 4/00; H04W 4/80; H04W 16/10; H04W 16/14; H04W 24/00; H04W 24/08; H04W 28/16; H04W 72/04; H04W 72/082; H04W 76/10; H04W 84/12
See application file for complete search history.

(56) References Cited

U.S. PATENT DOCUMENTS

| | | | |
|---|---|---|---|
| 8,938,255 B2 * | 1/2015 | Tsruya | G01S 5/0252 455/456.1 |
| 9,198,142 B2 | 11/2015 | Zhou et al. | |
| 9,654,232 B2 | 5/2017 | Manku | |
| 10,080,159 B2 | 9/2018 | Valliappan et al. | |
| 2007/0060098 A1* | 3/2007 | McCoy | G01S 5/06 455/404.2 |
| 2012/0134280 A1* | 5/2012 | Rotvoid | H04B 17/24 370/252 |
| 2016/0301434 A1* | 10/2016 | Botchway | H04W 52/24 |
| 2017/0140621 A1* | 5/2017 | Paden | G08B 29/20 |

OTHER PUBLICATIONS

Li, et al., Q-Learning-Based Dynamic Spectrum Access in Cognitive Industrial Internet of Things, Mobile Networks and Applications, Sep. 11, 2018, pp. 1636-1644, vol. 23, Springer.

* cited by examiner

*Primary Examiner* — Frank Duong
(74) *Attorney, Agent, or Firm* — Burris Law, PLLC

(57) ABSTRACT

A method includes obtaining a radio frequency (RF) signal magnitude for a plurality of RF signals broadcasted in an environment and generating a digital RF heat map of the environment based on each RF signal magnitude. The method includes determining an RF coverage of the environment based on the digital RF heat map and selecting, for a wireless communication device, a communication channel from among a plurality of communication channels based on the RF coverage and one or more RF probability distribution functions.

20 Claims, 5 Drawing Sheets

RADIO FREQUENCY SPECTRUM MANAGEMENT SYSTEMS AND METHODS IN A MANUFACTURING ENVIRONMENT

FIELD

The present disclosure relates to a system and/or method for managing a radio frequency spectrum of a manufacturing environment.

BACKGROUND

The statements in this section merely provide background information related to the present disclosure and may not constitute prior art.

In a manufacturing environment, wireless communication devices are utilized in various manufacturing processes. As an example, wireless communication devices may broadcast or receive various types of data (e.g., operational data, status data, among others) to/from a remote computing system, a static/autonomous robot, a machining cell, other wireless communication devices, among others. The wireless communication devices may utilize radio frequency (RF) signals and, more particularly, defined communication channels of an RF spectrum to broadcast or receive the data. However, signal interference and noise pollution can inhibit the transmission or reception of RF signals in the manufacturing environment. These issues with signal interference and noise pollution, among other issues, are addressed by the present disclosure.

SUMMARY

This section provides a general summary of the disclosure and is not a comprehensive disclosure of its full scope or all of its features.

The present disclosure provides a method including obtaining a radio frequency (RF) signal magnitude for a plurality of RF signals broadcasted in an environment and generating a digital RF heat map of the environment based on each RF signal magnitude. The method includes determining an RF coverage of the environment based on the digital RF heat map and selecting, for a wireless communication device, a communication channel from among a plurality of communication channels based on the RF coverage and one or more RF probability distribution functions.

In some forms, each of the one or more RF probability distribution functions indicates a probability of RF interference at a given location of the environment.

In some forms, the probability of RF interference indicates a probability of whether an RF signal interference magnitude is greater than a threshold RF signal interference magnitude.

In some forms, each of the one or more RF probability distribution functions corresponds to a given communication channel from among the plurality of communication channels and indicates the probability of RF interference over the given communication channel.

In some forms, each of the one or more RF probability distribution functions indicates the probability of RF interference at a plurality of nominal time values, a plurality of continuous time values, or a combination thereof.

In some forms, each of the one or more RF probability distribution functions indicates the probability of RF interference at a given qualitative time value.

In some forms, the RF signal magnitude for the plurality of RF signals are obtained using a plurality of RF sensors disposed in the environment.

In some forms, the method further includes generating a plurality of the digital RF heat maps of the environment based on each RF signal magnitude, where each of the plurality of digital RF heat maps corresponds to a given communication channel from among the plurality of communication channels.

In some forms, the method further includes determining a plurality of RF coverages of the environment based on the plurality of the digital RF heat maps, where each of the plurality of RF coverages corresponds to the given communication channel from among the plurality of communication channels.

In some forms, the communication channel is selected based on the plurality of RF coverages.

In some forms, the wireless communication device is configured to communicate using one of a BLUETOOTH-type protocol, a cellular protocol, a wireless fidelity-type protocol, a near-field communication protocol, and an ultra-wideband protocol.

The present disclosure provides a method including obtaining a radio frequency (RF) signal magnitude for a plurality of RF signals broadcasted in an environment and generating a digital RF heat map of the environment based on each RF signal magnitude. The method includes determining an RF coverage of the environment based on the digital RF heat map and selecting, for a wireless communication device, a communication channel from among a plurality of communication channels based on the RF coverage and one or more RF probability distribution functions, where each of the one or more RF probability distribution functions indicates a probability of whether an RF signal interference magnitude is greater than a threshold RF signal interference magnitude at a given location of the environment.

In some forms, each of the one or more RF probability distribution functions corresponds to a given communication channel from among the plurality of communication channels and indicates a probability of RF interference over the given communication channel.

In some forms, each of the one or more RF probability distribution functions indicates the probability of RF interference at a plurality of nominal time values, a plurality of continuous time values, or a combination thereof.

In some forms, each of the one or more RF probability distribution functions indicates the probability of RF interference at a given qualitative time value.

In some forms, the method further includes generating a plurality of the digital RF heat maps of the environment based on each RF signal magnitude, where each of the plurality of digital RF heat maps corresponds to a given communication channel from among the plurality of communication channels.

In some forms, the method further includes determining a plurality of RF coverages of the environment based on the plurality of the digital RF heat maps, where each of the plurality of RF coverages corresponds to the given communication channel from among the plurality of communication channels.

In some forms, the communication channel is selected based on the plurality of RF coverages.

A system is disclosed and includes a processor and a nontransitory computer-readable medium including instructions that are executable by the processor. The instructions include obtaining a radio frequency (RF) signal magnitude for a plurality of RF signals broadcasted in an environment and generating a digital RF heat map of the environment based on each RF signal magnitude. The instructions include determining an RF coverage of the environment based on the digital RF heat map and selecting, for a wireless communication device, a communication channel from among a plurality of communication channels based on the RF coverage and one or more RF probability distribution functions. Each of the one or more RF probability distribution functions indicates a probability of whether an RF signal interference magnitude is greater than a threshold RF signal interference magnitude at a given location of the environment. Each of the one or more RF probability distribution functions corresponds to a given communication channel from among the plurality of communication channels and indicates a probability of RF interference over the given communication channel.

In some forms, each of the one or more RF probability distribution functions indicates the probability of RF interference at a plurality of nominal time values, a plurality of continuous time values, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
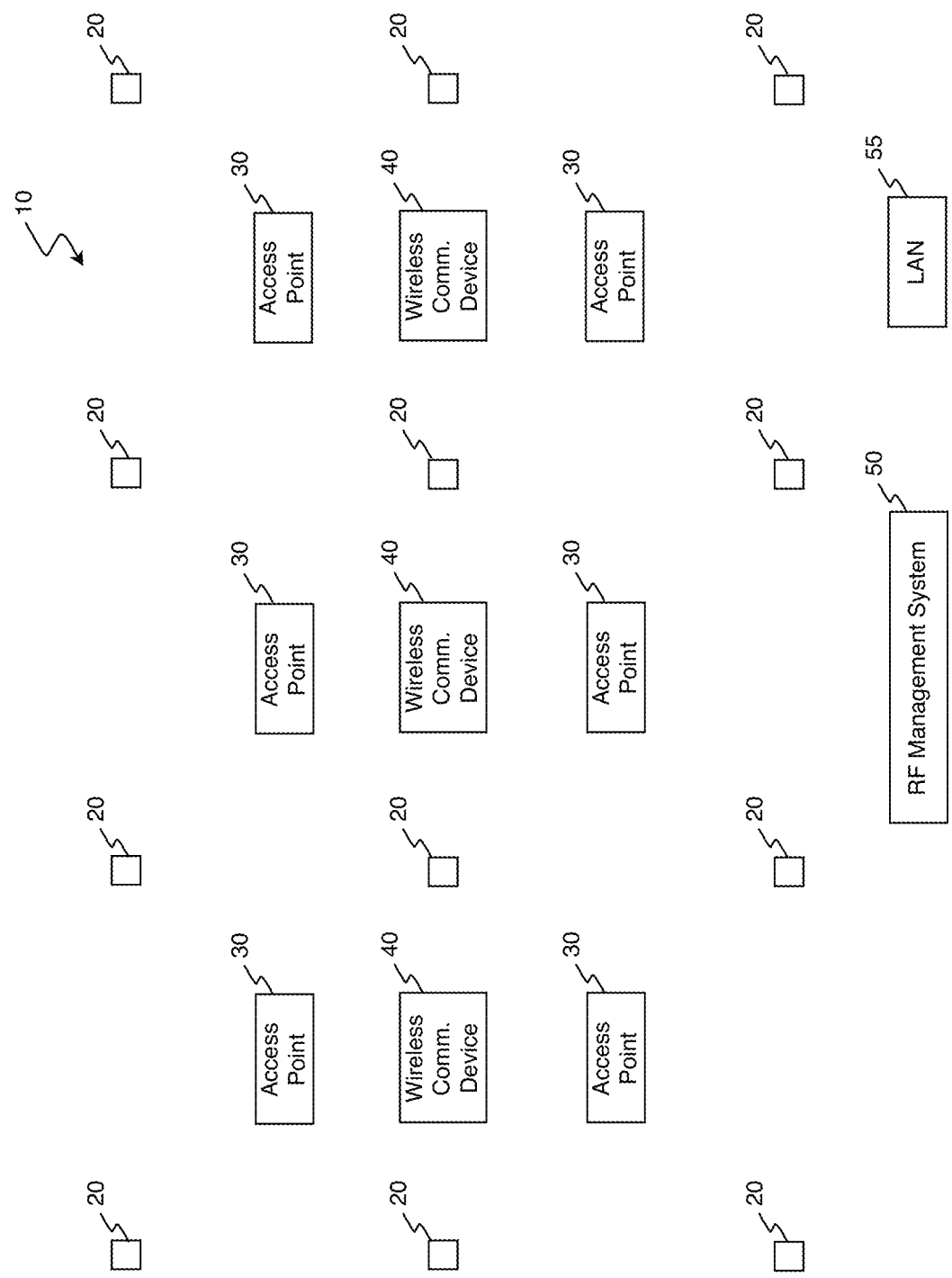
FIG. 1 illustrates a functional block diagram of a manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a radio frequency (RF) management system that obtains RF signal magnitudes broadcasted in an environment from a plurality of RF sensors. The RF management system generates a digital RF heat map of the environment based on each RF signal magnitude (e.g., a digital twin of the environment). The RF management system determines an RF coverage of the environment based on the digital RF heat map and selects, for a wireless communication device, a communication channel based on the RF coverage and a set of RF probability distribution functions. The RF probability distribution functions indicate a probability of RF interference at a given location of the environment.

The RF management system described herein assigns a respective communication channel for a wireless communication device to certain transmission/reception characteristics (e.g., power, protocol, among others) and RF interference thresholds that are determined based on current RF interference values and the time and/or location of previous RF interference values. As such, the likelihood of RF interference arising from multiple wireless communication devices communicating over a given wireless communication protocol is reduced or inhibited.

Referring to FIG. 1, a manufacturing environment 10 for manufacturing a component (e.g., a vehicle, engine, climate control system, etc.) is provided. The manufacturing environment 10 generally includes radio frequency (RF) sensors 20, access points 30, wireless communication devices 40, an RF management system 50, and a local area network (LAN) 55. While the RF management system 50 is illustrated as part of the manufacturing environment 10, it should be understood that the RF management system 50 may be positioned remotely from the manufacturing environment 10. In one form, the RF sensors 20, the access points 30, the wireless communication devices 40, and the RF management system 50 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the RF sensors 20 provide signal strength information of RF signals transmitted by the wireless communication devices 40 to the RF management system 50. The RF sensors 20 may include, but are not limited to: diode detector-based RF sensors, thermistor RF power sensors, thermocouple RF power sensors, among others. In one form, the signal strength may be represented by any suitable metric indicative of signal strength, including, but not limited to: a power ratio in decibels of the message (dBm), a power spectral density of the message (dBm/MHz), a packet error rate (PER) a signal-to-noise ratio (SNR), among other representations of the signal strength.

In one form, the RF sensors 20 provide identification information of the RF sensors 20 along with the signal strength information to the RF management system 50. In one form, the identification information includes data that uniquely identifies the corresponding RF sensor 20 and/or the location thereof. Based on the identification and signal strength information, the RF management system 50 generates one or more digital RF heat maps, as described below in further detail with reference to FIG. 2A.

In one form, the access points 30 are networking devices that enable the wireless communication devices 40 to establish a communication link with the LAN 55 using the wireless communication protocols described above. The access points 30 include, but is not limited to, a Wi-Fi-type router, a Wi-Fi-type signal booster/extender, among others. Furthermore, in some forms, the access points 30 are configured to provide channel information to the RF management system 50, where the channel information indicates which communication channels of a given wireless communication protocol are being utilized by the wireless communication devices 40 at a given time.

In one form, RF sensors 20 and the access points 30 are disposed at various fixed infrastructure elements of the manufacturing environment 10 including, but not limited to: an overhead beam, a tower, a light pole, a building, a sign, a machining device, a stationary storage rack/shelving system, among other fixed elements of the manufacturing environment 10. It should be understood that the RF sensors 20 and/or the access points 30 may be disposed at various moveable elements of the manufacturing environment 10 in other forms.

In one form, the wireless communication devices 40 are computing devices that utilize a wireless communication protocol to perform and/or assist a manufacturing operation. The computing devices may include, but are not limited to, a computer, laptop, smartphone, tablet, personal digital assistant (PDA), special purpose controllers for specific manufacturing operations, among others. As an example, the wireless communication devices 40 are computing devices disposed at partially or fully-autonomous vehicles that are configured to autonomously move to various locations of the manufacturing environment 10, such as, but not limited to: mobile robots, mobile workstations, drones, and/or automated guided vehicles, among other autonomous devices. As another example, the wireless communication devices 40 are computing devices disposed on a machining apparatus, such as a computer numerically controlled (CNC) machine. It should be understood that the wireless communication devices 40 may be other suitable devices performing various other operations and are not limited to the examples described herein.

Figure 2A:
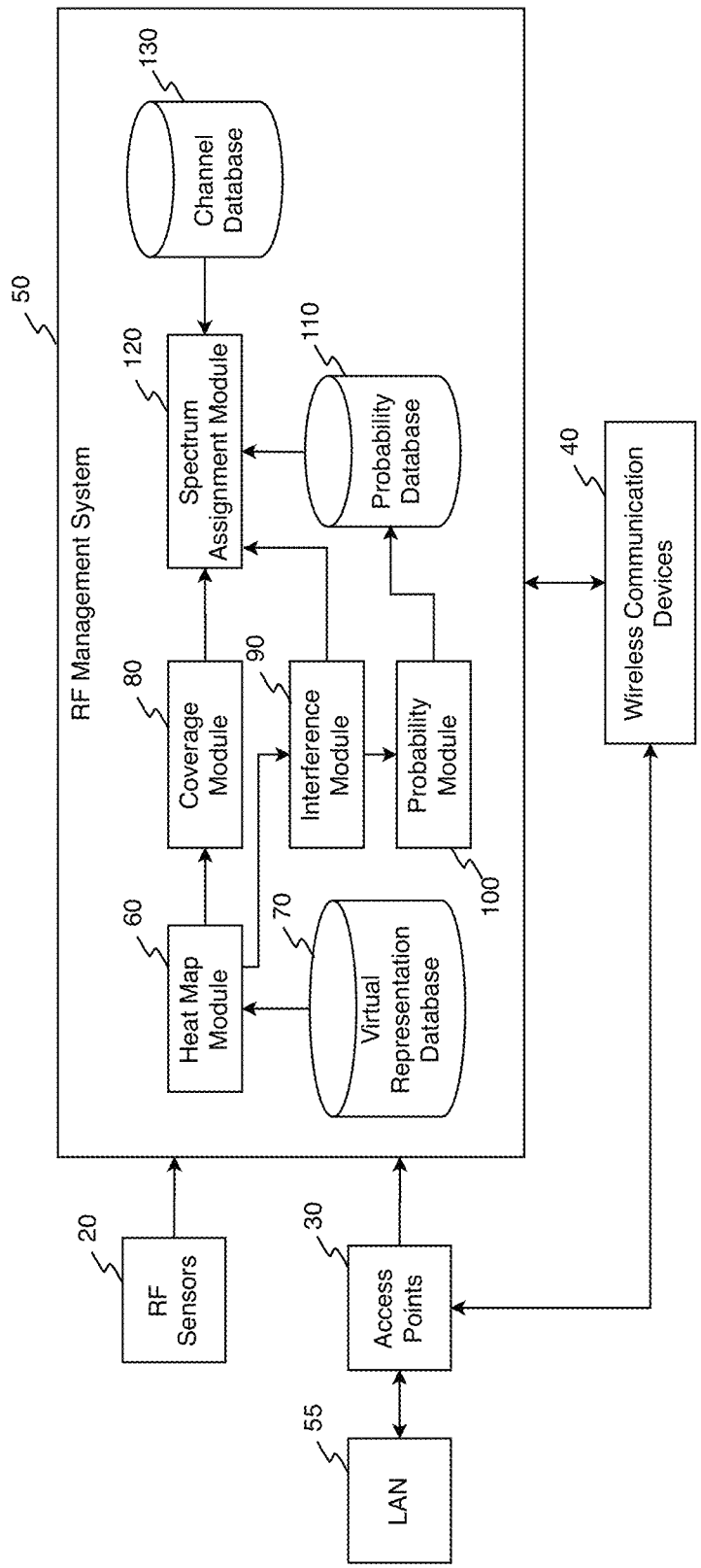
FIG. 2A illustrates a functional block diagram of a radio frequency management system in accordance with the teachings of the present disclosure.

Referring to FIG. 2A, the RF management system 50 includes a heat map module 60, a virtual representation database 70, a coverage module 80, an interference module 90, a probability module 100, a probability database 110, a spectrum assignment module 120, and a channel database 130. It should be readily understood that any one of the components of the RF management system 50 can be provided at the same location or distributed at different locations (e.g., via one or more edge computing devices) and communicably coupled accordingly. While the virtual representation database 70, the probability database 110, and the channel database 130 are illustrated as separate databases, it should be understood that any one of these databases may be selectively combined with another database in other forms.

Figure 2B:
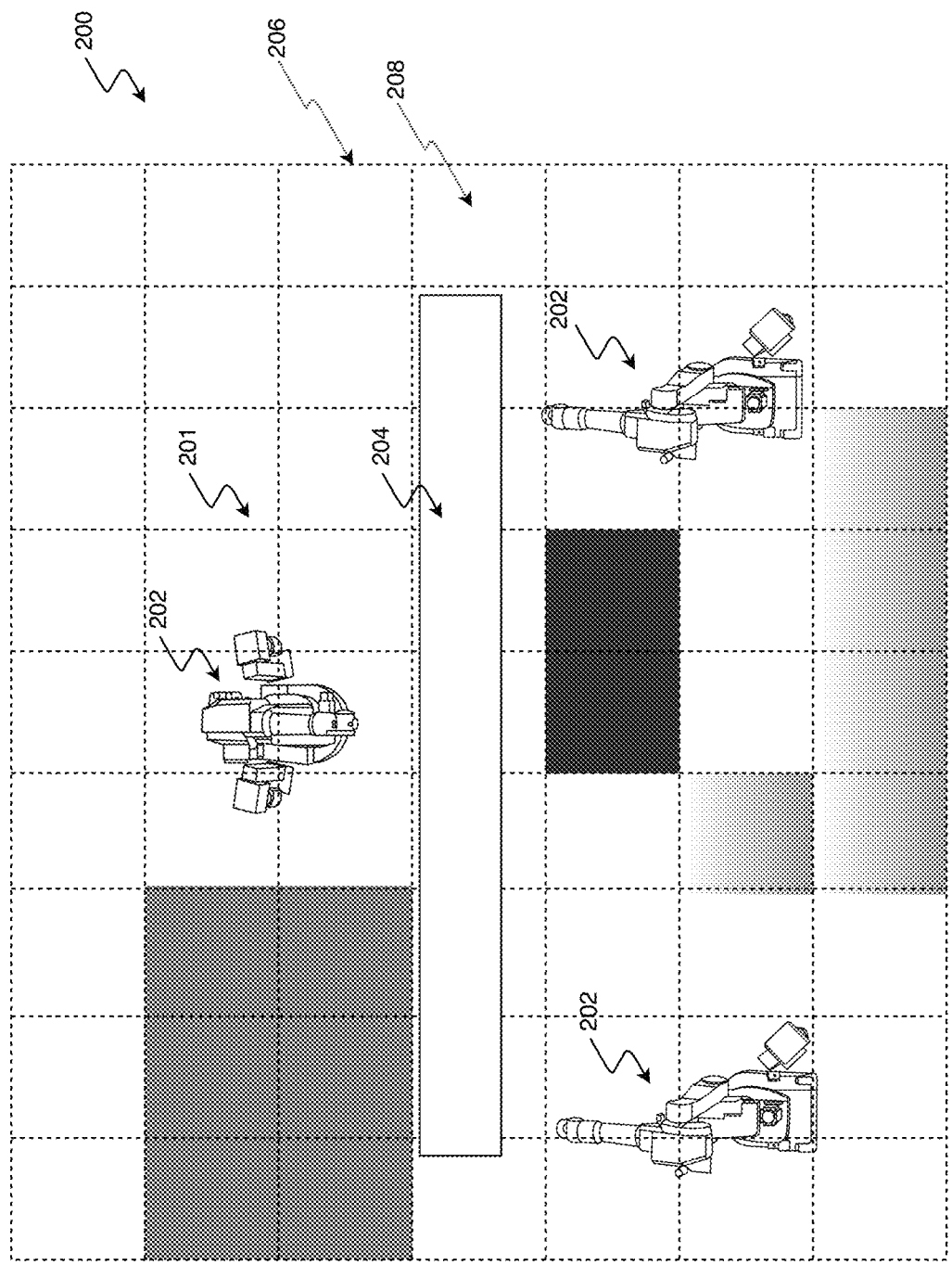
FIG. 2B illustrates a digital radio frequency heat map in accordance with the teachings of the present disclosure.

In one form, the heat map module 60 generates a digital RF heat map of the manufacturing environment 10 based on the RF signal magnitudes obtained by the RF sensors 20, identification information associated with the RF sensors 20, and/or a virtual representation of the manufacturing environment 10 stored in the virtual representation database 70. As an example and referring to FIG. 2B, the heat map module 60 generates a digital RF heat map 200 that includes a digital twin 201 of the manufacturing environment 10 including robots 202 and workstation 204 and a heat map 206 overlayed on the digital twin 201. In some forms, the heat map module 60 locates the RF signal magnitude on the digital twin 201 using the identification information of the RF sensors 20 and then employs one or more colors and/or varying color intensities to indicate the respective RF signal magnitude at the location. That is, the colors and/or intensities of various regions 208 of the heat map 206 are based on the obtained RF signal magnitude from the RF sensors 20 (e.g., darker colors indicate higher RF signal magnitudes and lighter colors indicate lower magnitudes). While the digital RF heat map 200 is illustrated as a two-dimensional representation, it should be understood that the digital RF heat map 200 may be a three-dimensional representation in other forms.

In one form, the heat map module 60 generates digital RF heat maps for each communication channel of one or more wireless communication protocols utilized in the manufacturing environment 10. As an example, the heat map module 60 may generate eleven digital RF heat maps for each channel of the 2.4 GHz band Wi-Fi communication protocol, forty-five digital RF heat maps for each channel of the 5 GHz band Wi-Fi communication protocol, and so on. It should be understood that the heat map module 60 may generate any other representation of the RF signal magnitudes within the manufacturing environment 10, such as a data matrix.

In one form and referring back to FIG. 2A, the coverage module 80 determines an RF coverage of the manufacturing environment 10 based on the digital RF heat map 200 generated by the heat map module 60. As an example, the coverage module 80 determines that a particular location of the manufacturing environment 10 is covered by RF signals based on the colors and/or intensities of the regions 208 of the digital RF heat map 200. Specifically, the coverage module 80 determines that regions 208 having a non-white shading indicate the presence of detected RF signals and vice versa. In some forms, the coverage module 80 may generate a numerical value representing the RF coverage of the manufacturing environment, such as a percentage, a quantized value, among others.

In one form, the interference module 90 determines an amount of RF signal interference based on the digital RF heat map 200. In one form, the interference module 90 determines the amount of RF signal interference using known spectrum analysis processing techniques that plot the RF signal magnitudes and the corresponding frequencies to identify RF signal interference. In one form, the RF signal interference is a numerical value indicating whether the RF signal interference of the manufacturing environment 10 (or a particular region 208) is below a threshold value. As an example, the RF signal interference may be represented as a binary value, where a 0 indicates the RF signal interference is below a threshold value, and a 1 indicates the RF signal interference is greater than the threshold value. As another example, the RF signal interference is represented as the power spectral density of the RF signal interference, a quantized value of the RF signal interference, or any other suitable metric for representing the RF signal interference. In some forms, multiple RF signal interferences may be determined at a given location for each communication channel of one or more wireless communication protocols utilized in the manufacturing environment 10.

In one form, the probability module 100 generates one or more probability entries based on the RF signal interference determined by the interference module 90 and stores the probability entries in the probability database 110. In one form, each probability entry identifies an RF probability distribution function that is based on previously obtained RF signal interferences. In one form, the probability module 100 updates the one or more probability entries by locating the corresponding probability entry and performing a statistical analysis routine in accordance with various known continuous probability distribution techniques.

In some forms, the RF probability distribution function indicates a probability of RF interference at a given location of the manufacturing environment 10 (e.g., the location corresponding to one of the regions 208, the entire manufacturing environment 10, among others), a given time, and/or a given communication channel. As an example, the RF probability distribution function indicates, for a given time, location, and communication channel, the probability of RF interference in relation to a threshold RF signal interference (e.g., the probability of RF interference being greater than a threshold RF signal interference magnitude).

Figure 2C:
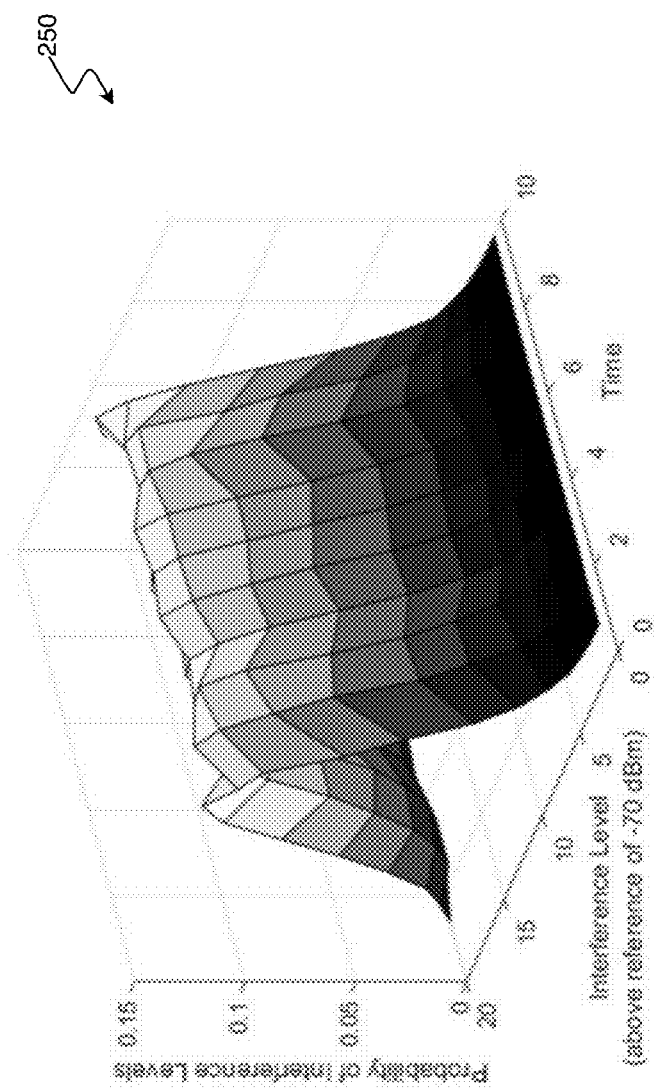
FIG. 2C illustrates an entry of a probability database in accordance with the teachings of the present disclosure.

In one form, the given time may be a plurality of nominal time values, a plurality of continuous time values, and/or at a given qualitative time value. As used herein, "nominal time values" refers to a discrete time (e.g., 8:30 PM, 9:15 AM, among others). As used herein, "continuous time values" refers to a period of time between two nominal time values (e.g., the time between 8:30-9:30 PM). As used herein, "qualitative time value" refers to a nonnumerical description of a time period (e.g., morning, afternoon, evening, day of the week, rush-hour period, holidays, among others). As an example and referring to FIG. 2C, RF probability distribution function 250 represents the probability of the RF interference being 0-20 dBM greater than a threshold value (e.g., −70 dBM) at multiple given times ($T_0$-$T_{10}$) for a given channel of a communication protocol.

Referring back to FIG. 2A, the spectrum assignment module 120 assigns a communication channel for the wireless communication device 40 based on the RF coverages determined by the coverage module 80, the RF interferences determined by the interference module 90, and/or the corresponding RF probability distribution function of the probability database 110. In one form, the spectrum assignment module 120 assigns the communication channel for the wireless communication devices 40 in response to a request to establish a wireless communication link in the manufacturing environment 10. In another form, the spectrum assignment module 120 continuously assigns communication channels for the wireless communication devices 40. As an example, the wireless communication device 40 may be assigned a channel from the channel database 130 at a given time that maximizes RF coverage and minimizes the current RF interference as determined by the interference module 90 and/or the predicted RF interference as indicated by the corresponding RF probability distribution function of the probability database 110. In one form, the channel database 130 stores the channels of the various communication protocols.

In some forms, the spectrum assignment module 120 assigns the communication channel based on a predefined control rules of the various modules of the RF management system 50. For example, a predefined control rule includes disregarding the predicted RF interference as indicated by the corresponding RF probability distribution function when assigning the channel if the current RF interference indicates the RF interference is greater than the threshold value. In another example, a predefined control rule includes disregarding requests from the wireless communication devices 40 if the current RF interference indicates the RF interference is greater than a given threshold value. It should be understood that various predefined control rules can be implemented and are not limited to the examples provided herein.

In some forms, the spectrum assignment module 120 assigns the communication channel based on a predefined request rules associated with wireless communication devices 40. For example, a predefined request rule includes assigning the communication channel based on an interference tolerance associated with the wireless communication device 40, where the interference tolerance identifies a maximum level of acceptable RF interference for operating the wireless communication device 40. In another example, a predefined request rule includes assigning the communication channel based on a ranking associated with the wireless communication device 40, where the ranking identifies a relative importance for carrying out a manufacturing process among the wireless communication devices 40 (e.g., a wireless communication device 40 with a higher ranking may be assigned a channel with less RF interference, and vice versa). It should be understood that various types of predefined request rules can be implemented and are not limited to the examples provided herein.

Figure 3:
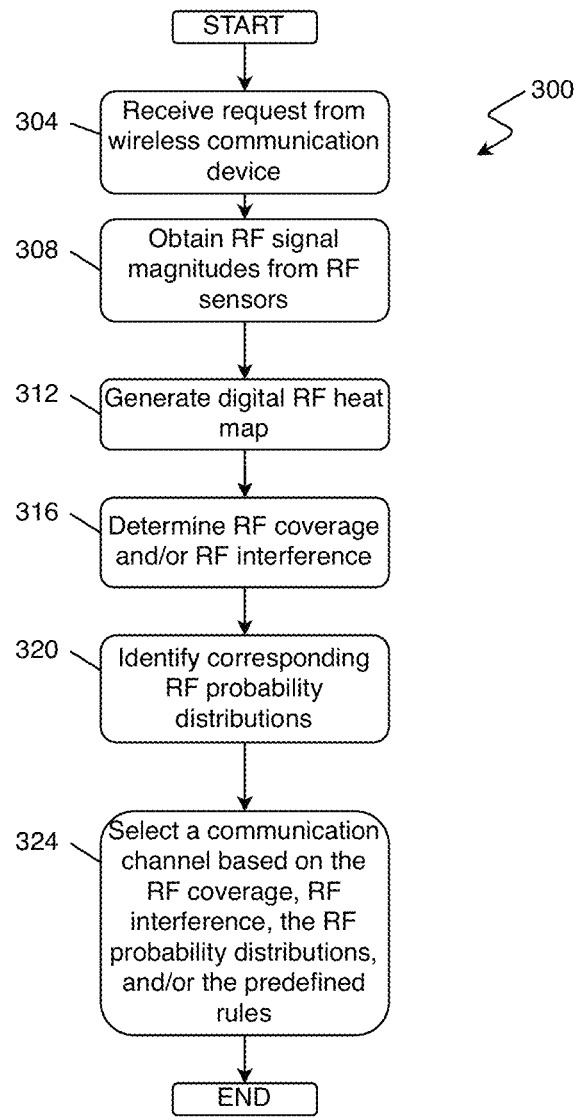
FIG. 3 is a flowchart of an example control routine in accordance with the teachings of the present disclosure.

With reference to FIG. 3, a routine 300 for selecting a communication channel is provided and performed by the RF management system 50. At 304, the RF management system 50 receives a request from the wireless communication device 40 to communicate wirelessly in the manufacturing environment 10. At 308, the RF management system 50 obtains RF signal magnitudes from the RF sensors 20. At 312, the RF management system 50 generates the digital RF heat map. At 316, the RF management system 50 determines the RF coverage and/or interference. At 320, the RF management system 50 identifies the corresponding RF probability distribution functions. At 324, the RF management system 50 selects a communication channel based on the RF coverage, the RF interference, the RF probability distribution functions, and/or the predefined rules (i.e., the predefined control rules and the predefined request rules). While the routine 300 describes selecting the communication channel in response to the request from the wireless communication device 40, it should be understood that steps 308-324 can be performed continuously or periodically and without a request being received from the wireless communication device 40 at 304. Accordingly, the RF management system 50 may be configured in various suitable ways to perform the operations herein, and is not limited to the routine 300.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term controller may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
    obtaining a radio frequency (RF) signal magnitude for a plurality of RF signals broadcasted in an environment;
    generating a digital RF heat map of the environment based on each RF signal magnitude;
    determining an RF coverage of the environment and an RF interference of the environment based on the digital RF heat map; and
    selecting, for a wireless communication device, a communication channel from among a plurality of communication channels based on the RF coverage, the RF interference, and a predicted interference associated with one or more RF probability distribution functions stored in a database.

2. The method of claim 1, wherein the predicted interference indicates a probability of RF interference at a given location of the environment.

3. The method of claim 2, wherein the probability of RF interference indicates a probability of whether an RF signal interference magnitude is greater than a threshold RF signal interference magnitude.

4. The method of claim 2, wherein each of the one or more RF probability distribution functions:
    corresponds to a given communication channel from among the plurality of communication channels; and
    indicates the probability of RF interference over the given communication channel.

5. The method of claim 2, wherein the predicted interference indicates the probability of RF interference at a plurality of nominal time values, a plurality of continuous time values, or a combination thereof.

6. The method of claim 2, wherein the predicted interference indicates the probability of RF interference at a given qualitative time value.

7. The method of claim 1, wherein the RF signal magnitude for the plurality of RF signals are obtained using a plurality of RF sensors disposed in the environment.

8. The method of claim 1 further comprising generating a plurality of the digital RF heat maps of the environment based on each RF signal magnitude, wherein each of the plurality of digital RF heat maps corresponds to a given communication channel from among the plurality of communication channels.

9. The method of claim 8 further comprising determining a plurality of RF coverages of the environment based on the plurality of the digital RF heat maps, wherein each of the plurality of RF coverages corresponds to the given communication channel from among the plurality of communication channels.

10. The method of claim 9, wherein the communication channel is selected based on the plurality of RF coverages.

11. The method of claim 1, wherein the wireless communication device is configured to communicate using one of a BLUETOOTH-type protocol, a cellular protocol, a wireless fidelity-type protocol, a near-field communication protocol, and an ultra-wideband protocol.

12. A method comprising:
    obtaining a radio frequency (RF) signal magnitude for a plurality of RF signals broadcasted in an environment;
    generating a digital RF heat map of the environment based on each RF signal magnitude;
    determining an RF coverage of the environment and an RF interference of the environment based on the digital RF heat map; and
    selecting, for a wireless communication device, a communication channel from among a plurality of communication channels based on the RF interference, the RF coverage, and a predicted interference associated with one or more RF probability distribution functions stored in a database, wherein the predicted interference indicates a probability of whether an RF signal interference magnitude is greater than a threshold RF signal interference magnitude at a given location of the environment.

13. The method of claim 12, wherein each of the one or more RF probability distribution functions:
    corresponds to a given communication channel from among the plurality of communication channels; and
    indicates a probability of RF interference over the given communication channel.

14. The method of claim 13, wherein the predicted interference indicates the probability of RF interference at a plurality of nominal time values, a plurality of continuous time values, or a combination thereof.

15. The method of claim 13, wherein the predicted interference indicates the probability of RF interference at a given qualitative time value.

16. The method of claim 12 further comprising generating a plurality of the digital RF heat maps of the environment based on each RF signal magnitude, wherein each of the plurality of digital RF heat maps corresponds to a given communication channel from among the plurality of communication channels.

17. The method of claim 16 further comprising determining a plurality of RF coverages of the environment based on the plurality of the digital RF heat maps, wherein each of the plurality of RF coverages corresponds to the given communication channel from among the plurality of communication channels.

18. The method of claim 17, wherein the communication channel is selected based on the plurality of RF coverages.

19. A system comprising:
a processor; and
a nontransitory computer-readable medium including instructions that are executable by the processor, wherein the instructions include:
   obtaining a radio frequency (RF) signal magnitude for a plurality of RF signals broadcasted in an environment;
   generating a digital RF heat map of the environment based on each RF signal magnitude;
   determining an RF coverage of the environment and an RF interference of the environment based on the digital RF heat map; and
   selecting, for a wireless communication device, a communication channel from among a plurality of communication channels based on the RF interference, the RF coverage, and a predicted interference associated with one or more RF probability distribution functions stored in a database, wherein the predicted interference indicates a probability of whether an RF signal interference magnitude is greater than a threshold RF signal interference magnitude at a given location of the environment, and wherein each of the one or more RF probability distribution functions:
   corresponds to a given communication channel from among the plurality of communication channels; and
   indicates a probability of RF interference over the given communication channel.

20. The system of claim 19, wherein the predicted interference indicates the probability of RF interference at a plurality of nominal time values, a plurality of continuous time values, or a combination thereof.

* * * * *